(12) United States Patent
Dent

(10) Patent No.: US 6,415,162 B1
(45) Date of Patent: Jul. 2, 2002

(54) INTERSTITIAL SECTOR SYSTEM

(75) Inventor: Paul W. Dent, Pittsboro, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 08/728,754

(22) Filed: Oct. 11, 1996

(51) Int. Cl.[7] .............................................. H04B 1/38
(52) U.S. Cl. ..................... 455/562; 455/450; 455/422; 455/446
(58) Field of Search .................. 455/422, 446–447, 455/449, 517, 524, 525, 550, 561, 562, 101, 132, 269, 272, 273, 450, 451, 455, 509, 516

(56) References Cited

U.S. PATENT DOCUMENTS

| | | | |
|---|---|---|---|
| 4,775,998 A | | 10/1988 | Felix et al. |
| 5,021,801 A | * | 6/1991 | Smith et al. ................. 455/562 |
| 5,073,971 A | * | 12/1991 | Schaeffer .................... 455/447 |
| 5,111,534 A | * | 5/1992 | Benner ........................ 455/447 |
| 5,193,109 A | * | 3/1993 | Lee ............................. 455/562 |
| 5,535,423 A | * | 7/1996 | Dupuy ........................ 455/562 |
| 5,551,060 A | * | 8/1996 | Fujii et al. .................. 455/562 |
| 5,724,666 A | * | 3/1998 | Dent ........................... 455/132 |
| 5,742,911 A | * | 4/1998 | Dumbrill et al. ............ 455/422 |

FOREIGN PATENT DOCUMENTS

| | | |
|---|---|---|
| EP | 0 596 699 A2 | 11/1993 |
| EP | 0 734 194 A1 | 3/1995 |
| EP | 0 715 478 A2 | 6/1996 |
| FR | 2 690 023 A1 | 4/1992 |
| WO | WO 91/01073 | 1/1991 |
| WO | WO 91/13502 | 9/1991 |
| WO | WO 96/00466 | 1/1996 |

OTHER PUBLICATIONS

ISR for PCT/US97/18073 completed on Aug. 6, 1998, Aug. 14, 1998.

* cited by examiner

*Primary Examiner*—Doris H. To
(74) *Attorney, Agent, or Firm*—Coats & Bennett, P.L.L.C.

(57) ABSTRACT

A method and apparatus for improving the reception characteristics for lower-power portable telephone units at a base station site is disclosed. A normal three-sector antenna site is divided into a plurality of sectors each having a central line of focus. The frequency channels assigned to the base station site are divided among the sectors, and an antenna within each sector radiates the assigned frequencies along the central line of focus for each of the sectors.

20 Claims, 7 Drawing Sheets

FIG.4

GAINS ACHIEVABLE WITHOUT NARROWING THE BASIC ANTENNA PATTERN IN AZIMUTH

| MOBILE POSITION, DEGREES | -30 | -15 | 0 | +15 | +30 |
|---|---|---|---|---|---|
| BASELINE | 0dB | 0dB | 0dB | 0dB | 0dB |
| 6-SECTOR | 0dB | 3.5dB | 4.9dB | 3.5dB | 0dB |
| 12-SECTOR | 2.4dB | 3.5dB | 4.9dB | 3.5dB | 2.4dB |
| INFINITE | 2.4dB | 4.5dB | 4.9dB | 4.5dB | 2.4dB |

FURTHER GAINS ACHIEVABLE ON RECEIVE BY DIVERSITY COMBINING ADJACENT SECTORS

| | | | | | |
|---|---|---|---|---|---|
| 2 OUT OF 6 DIVERSITY-COMBINING | 3-5dB | 4.6dB | 5.1dB | 4.6dB | 3-5dB |
| 3 OUT OF 6 DIVERSITY-COMBINING | 3-5dB | 4.7dB | 5.5dB | 4.7dB | 3-5dB |
| 2 OUT OF 12 DIVERSITY | 5-7dB | 5-7dB | 5-7dB | 5-7dB | 5-7dB |
| 3 OUT OF 12 DIVERSITY | 6.5-8.5 | 6.5-8.5 | 9-11dB | 6.5-8.5 | 6.5-8.5 |

FIG.6

TABLE 2: PERMUTATION OF 24 FREQUENCIES A...X BETWEEN 6 SECTORS TO PROVIDE 24 ORTHOGONAL HOPSETS OF 8 FREQUENCIES EACH

| | | |
|---|---|---|
| HOPSET FOR MOBILE 1 | AXWVUDCB | ) Mobile locations 0-60 degrees |
| HOPSET FOR MOBILE 2 | BAXWVUDC | ) (overlap between red sector 1 |
| HOPSET FOR MOBILE 3 | CBAXWVUD | ) and blue sector 1) |
| HOPSET FOR MOBILE 4 | DCBAXWVU | ) |
| HOPSET FOR MOBILE 5 | EDCBAHGF | ) Mobile locations 60-120 deg. |
| HOPSET FOR MOBILE 6 | FEDCBAHG | ) (overlap between blue sector 1 |
| HOPSET FOR MOBILE 7 | GFEDCBAH | ) and red sector 2) |
| HOPSET FOR MOBILE 8 | HGFEDCBA | ) |
| HOPSET FOR MOBILE 9 | IHGFELKJ | ) Mobile locations 120-180 deg. |
| HOPSET FOR MOBILE 10 | JIHGFELJ | ) (overlap between red sector 2 |
| HOPSET FOR MOBILE 11 | KJIHGFEL | ) and blue sector 2) |
| HOPSET FOR MOBILE 12 | LKJIHGFE | ) |
| HOPSET FOR MOBILE 13 | MLKJIPON | ) Mobile locations 180-240 deg. |
| HOPSET FOR MOBILE 14 | NMLKJIPO | ) (overlap between blue sector 2 |
| HOPSET FOR MOBILE 15 | ONMLKJIP | ) and red sector 3) |
| HOPSET FOR MOBILE 16 | PONMLKJI | ) |
| HOPSET FOR MOBILE 17 | QPONMTSR | ) Mobile locations 240-300 deg. |
| HOPSET FOR MOBILE 18 | RQPONMTS | ) (overlap between red sector 3 |
| HOPSET FOR MOBILE 19 | SRQPONMT | ) and blue sector 3) |
| HOPSET FOR MOBILE 20 | TSRQPONM | ) |
| HOPSET FOR MOBILE 21 | UTSRQXWV | ) Mobile locations 300-0 degress |
| HOPSET FOR MOBILE 22 | VUTSRQXW | ) (overlap between blue sector 3 |
| HOPSET FOR MOBILE 23 | WVUTSRQX | ) and red sector 1) |
| HOPSET FOR MOBILE 24 | XWVUTSRQ | ) |

INTERSTITIAL SECTOR SYSTEM

BACKGROUND OF THE INVENTION

1. Technical Field of the Invention

The present invention relates to sectorized antenna for use with cellular communication systems, and more particularly, to a sectorized antenna configuration utilizing a plurality of frequencies having their beamwidth focused within a plurality of equally spaced sectors about a base station site.

2. Description of Related Art

Personal Communication Services (PCS) Systems provide users with a variety of wireless telephone services through low-power portable telephone units. The popularity of PCS is expected to grow exponentially over the next few years and PCS operators in the U.S. are faced with the problem of providing nationwide coverage to attract subscribers. The use of large cells is required in order for providers to economically provide nationwide coverage to their subscribers.

However, PCS phones need to be smaller and have longer talk times. This requires lower power consumption by the telephone unit. In order to maintain presently existing or larger cell sizes in conjunction with units having lower power output requires improvement of base station receiving capabilities. With noise factors perhaps already as low as possible, one solution for obtaining better base station receiver capabilities may be by reducing cabling loses with active antennas. Improved antenna arrangement and the use of more diversity reception are additional solutions for improving the receiver characteristics of the base station.

SUMMARY OF THE INVENTION

The foregoing and other problems are overcome by the method and apparatus of the present invention for improving the receiver characteristics of a base station. A normal three-sector base station site having a plurality of assigned channel frequencies is subdivided into a plurality of 120° sectors wherein each of the sectors has a sector antenna generating a directional antenna beam for the sector.

A plurality of channel frequencies are assigned to each of the sectors such that the base station transmits and receives along each sector antenna only the assigned frequencies for the sector. For a cellular telephone system such as DAMPS, the frequency channels are equally divided among each of the sectors such that no particular frequency is used within more than one sector. However, in a GSM type system, frequencies within a particular sector may be shared with adjacent sectors via frequency hopping techniques.

By increasing the number of sectors around a particular base station and uniquely assigning a group of channel frequencies to each sector, the likelihood of a portable mobile unit residing within a beam peak is greatly increased. Furthermore, the angular distance from a beam peak, and thus the gain losses, are necessarily smaller. These factor combine to improve the receiver characteristics of the base station for lower power telephone units. The system may further improve receiver characteristics using diversity combinations between signals received in adjacent sectors from the same telephone unit.

BRIEF DESCRIPTION OF THE DRAWINGS

A more complete understanding of the method and apparatus of the present invention may be obtained by reference to the following Detailed Description when taken in conjunction with the accompanying Drawings wherein:

FIG. 4 is a table illustrating the effects of multi-sector configurations and diversity combination upon the gain loss at various angles from the beam peak;

FIG. 6 is a table illustrating orthogonal hopsets for 24 mobiles communicating with a single site.

DETAILED DESCRIPTION OF THE DRAWINGS

Figure 1A:
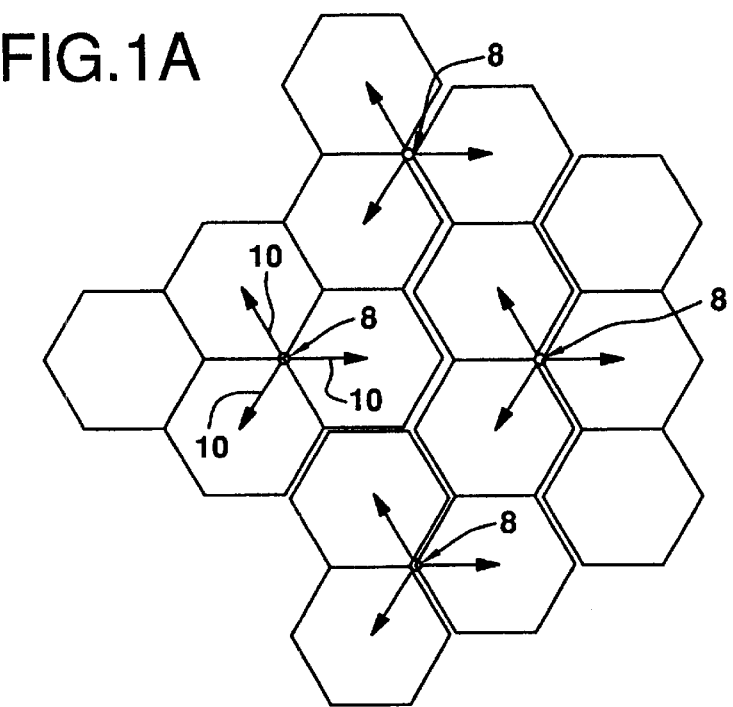
FIGS. 1a and 1b illustrate commonly used three-sector site arrangements.
Figure 1B:
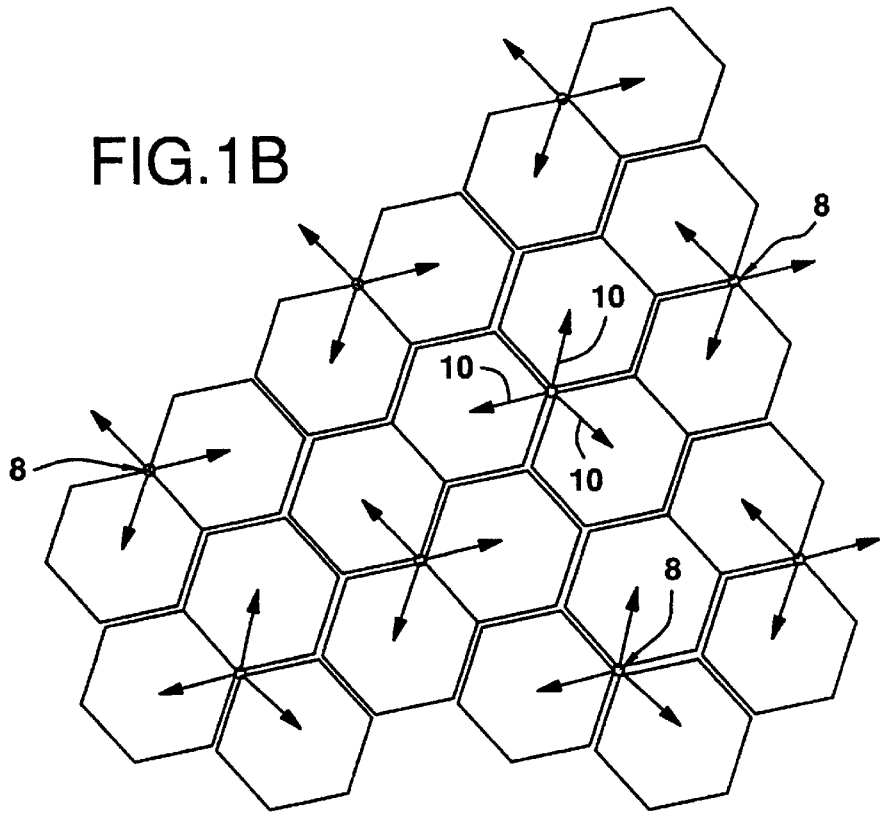

Referring now to the drawings, and more particularly to FIGS. 1a and 1b, there are illustrated two commonly used three-sector per site arrangements for providing cellular air coverage. The configuration of FIG. 1a arranges each site such that one antenna of the three-sectorized antennas 10 at each site 8 points directly toward a neighboring site 8. In the configuration in FIG. 1b, the three-sectorized antennas 10 at each site 8 point between neighboring sites.

Figure 2:
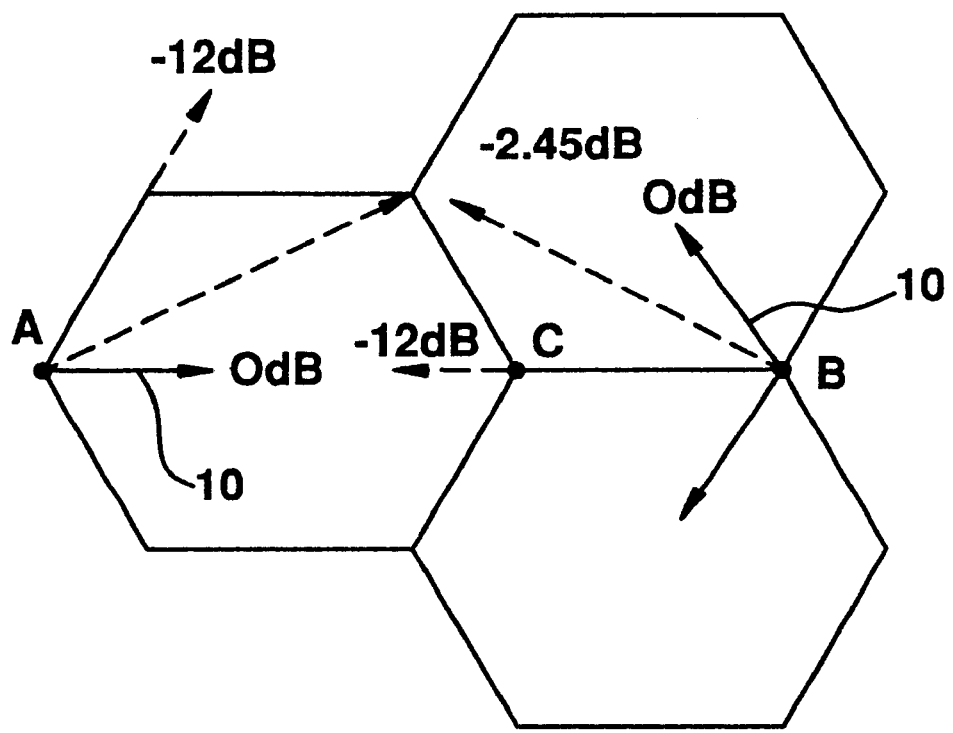
FIG. 2 illustrates the path loss geometry inherent in presently existing sectorized antenna configurations.

Signal power, range and propagation considerations determine which particular site will control a cellular call. The site best receiving the mobile unit signal preferably controls the call. FIG. 2 illustrates the path loss geometry for the site configuration illustrated in FIG. 1a. Relative antenna gain to reach all cell extremities at equal strength is calculated as a function of angle from the focus direction of the sectorized antenna 10. No gain losses are recorded along the line of focus of the antenna 10. At an angle of 30° from the line of focus of the antenna 10, the antenna pattern demonstrates a −2.45 db drop in gain from the peak beam direction. At 60°, the drop is −12 db from the peak beam direction. These values of gain versus angle assure roughly constant signal strength from or to mobiles along the cell boundary.

For example, the mobile at location "C" can be reached with equal power from site "A" at a distance of 2X with full antenna gain or from site "B" at a distance of X with a 12 dB gain loss. A mobile at point "D" can be reached from site ether "A" or "B" at a distance of $\sqrt{3}X$ with a 2.45 dB antenna gain reduction from the peak gain. The site configuration of FIG. 1b has similar loss characteristics.

The antenna gain loss as a function of angle from the focus line is known as the antenna pattern or radiation diagram. The antenna gain is thus normally deliberately chosen to be a function of the angle of offset from the peak gain direction or focus line, such that equal reception from or transmission to mobiles at any point on the hexagonal cell boundary is achieved. Nevertheless, it is a disadvantage of conventional three-sector systems that the mobile unit must use 12 db more transmitter power, when located at 60° offset from the focus line, than if an antenna beam had been provided and focused exactly in the mobile's direction. Providing such additional beams, called Interstitial Beams, is an object of the invention.

Figure 3:
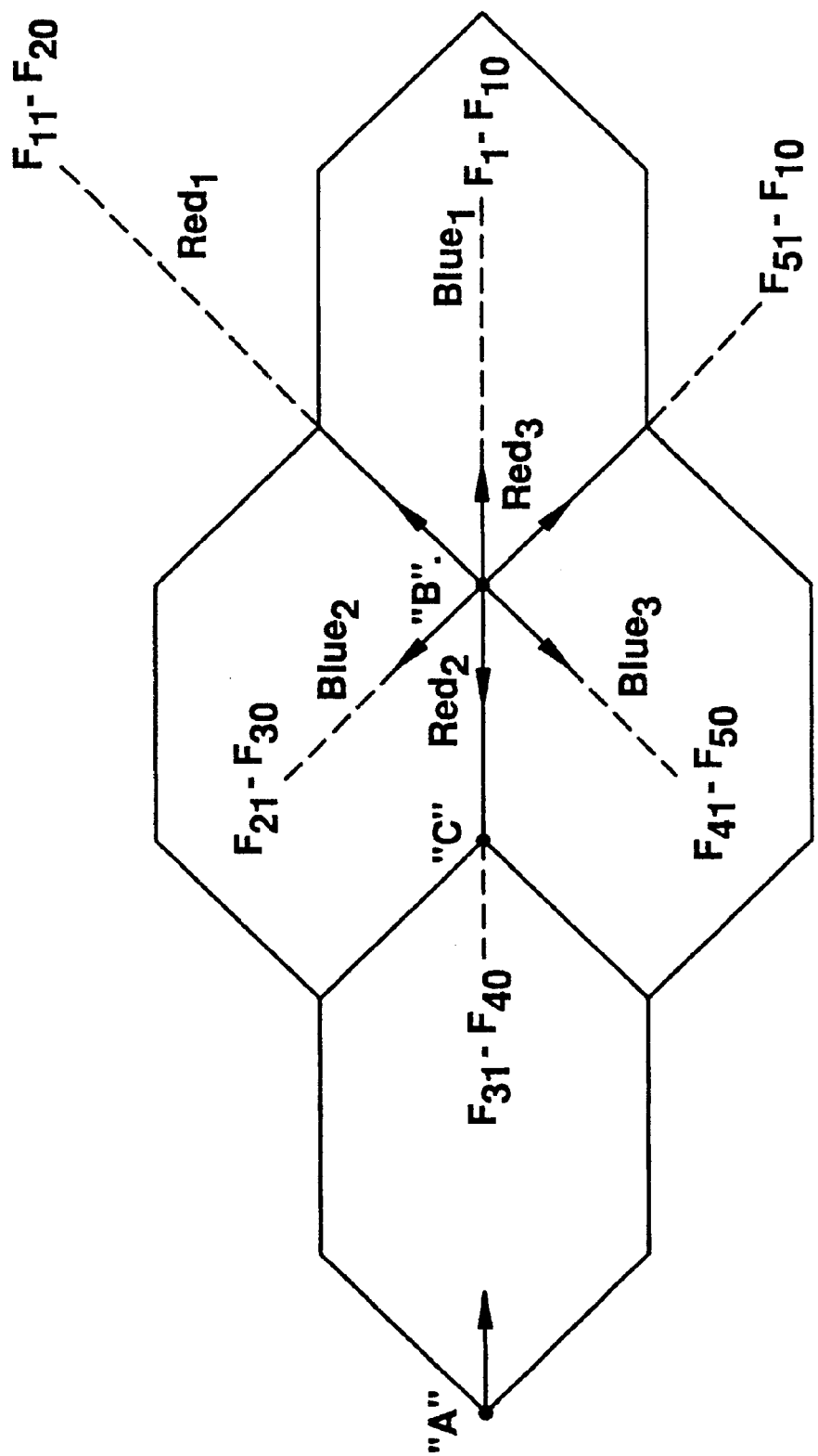
FIG. 3 illustrates an interstitial sector approach for improving base station reception within existing cell sizes or enabling reception within larger size cells for a DAMPS system.

Referring now to FIG. 3, there is illustrated an interstitial sector approach for improving the receiving characteristics of a base station. The discussion of FIG. 3 will be with respect to the advanced mobile phone system (AMPS). In the AMPS system, service providers are assigned approximately 420, 30 KHz channels. Normally, a 21-cell pattern including seven, three-sector sites is constructed with 20 frequencies per sector or cell that is 60 frequencies per site. In the system illustrated in FIG. 1, all 20 frequencies in a particular sector are radiated in the same direction.

In an alternate sector approach as shown in FIG. 3, the cell site is divided into six sectors pointing at 0°, 60°, 120°, 180°, 240°, and 300°, respectively. Ten frequencies are assigned to each sector and radiated along the centerline for a sector. For purposes of discussion the 0°, 120°, and 240° antenna sector are designated "blue" sectors while the 60°, 180°, and 300° antenna sectors are designated "red" sectors. Frequencies $F_1$–$F_{10}$ are assigned to the "blue" sector at 0°, $F_{11}$–$F_{20}$ are assigned to the "red" sector at 60° and so on as illustrated in FIG. 3.

The mobile switching center (not shown) is still configured to a three-sector system but treats the "blue" sectors as one base station with ten frequencies in each sector and the "red" sectors as another base station with ten frequencies in each sector. The fact that these two base stations are cosited does not affect the function of the switching center.

By allocating the antenna frequencies over six sectors about the site rather than three, there is a greater chance for a mobile unit to be within a beam peak area. The distance between beam peak areas is only 60° rather than 120°, and the maximum gain loss angle would be 30° for a six sector site. Thus, the potential for loss is minimized over large areas of the cell. For example, a mobile at "C" is received by the blue-base "A" 0° sector antenna and blue-base "B" 120° sector antenna equally. In previous configuration neither site would have an advantage over the other. However, the red-base "B" 180° sector antenna is received 12 db stronger by the mobile, since the mobile is located within the peak of the "red" base antenna at only half the maximum range. The mobile would be connected to the "red" base station until it moved out to point "E", at which point it would be equally served by either the A-blue station or the B-red station.

The arrangement of the frequencies over six sites effectively increases the size of the coverage served by site "B" to the hexagon representing by the hexagon 30 shown in phantom. Rather than covering a larger area site "B" can also receive signals from lower power mobile units within the same size cell coverage area.

Although the present embodiment has been discussed with respect to the use 10 frequencies within each of six sectors, the six sectors can further be divided into 12 sectors having five frequencies assigned to each sector. The two further three-sector base stations having a 30-degree antenna offset from the previously discussed "blue" and "red" patterns would further improve coverage within the existing cell or extend the range of site "B." The gain of the 12-sector system at ±60 degree can be obtained without using 12 antennas. Virtual antennas having radiation patterns in between the original six-sectors can be formed by actively combining neighboring antennas. Such combinations at low receiver powers can produce virtual beams in any direction, depending upon the weighting.

Referring now to the table shown in FIG. 4, there is illustrated the effect of six-sector, 12-sector, and infinite-sector configurations on the gain losses for a mobile unit located at ±15 and ±30° from the base station. The second portion of the table of FIG. 4 illustrates the gains achievable using diversity combination between adjacent, uncorrelated sectors.

If the fading between neighboring antennas is completely correlated, the gain loss is simply 3 dB at the +60 degree locations. If the fading is uncorrelated, neighboring antennas can be used to increase the order of the reception diversity as illustrated in the table. Uncorrelated signals between neighboring antennas can be guaranteed by using opposite circular polarizations for blue and red sectors. The order of diversity can be further increased by using the nearest neighboring sectors out of the six sectors to receive each mobile signal. Thus, for a mobile at 10° antenna signals from −60°, 0° and +60° are used in a metric combiner to generate the best signal. The gains achievable in this way are illustrated in the column for "3 out of 6 diversity combining" in FIG. 4. The C/I gains for this option will be very large due to the possibility of nulling out both dominant interferers, as described in U.S. patent application Ser. No. 08/286,775, which is hereby incorporated by reference.

Since the six receiving antennas are equally distributed around 360°, they do not need to provide ±60° beamwidth at −12 db any longer. However, the patterns for an optimized six-sector system show very little improvement over those of a three-sector system, and even less when diversity is used. Further gains can only be achieved by increasing the number of receiving antennas above six. Increasing the order of diversity then wins more gain increases because the pattern overlap is greater and more neighboring antennas can be combined to enhance the beam forming affect or interference rejection effect.

Figure 5:
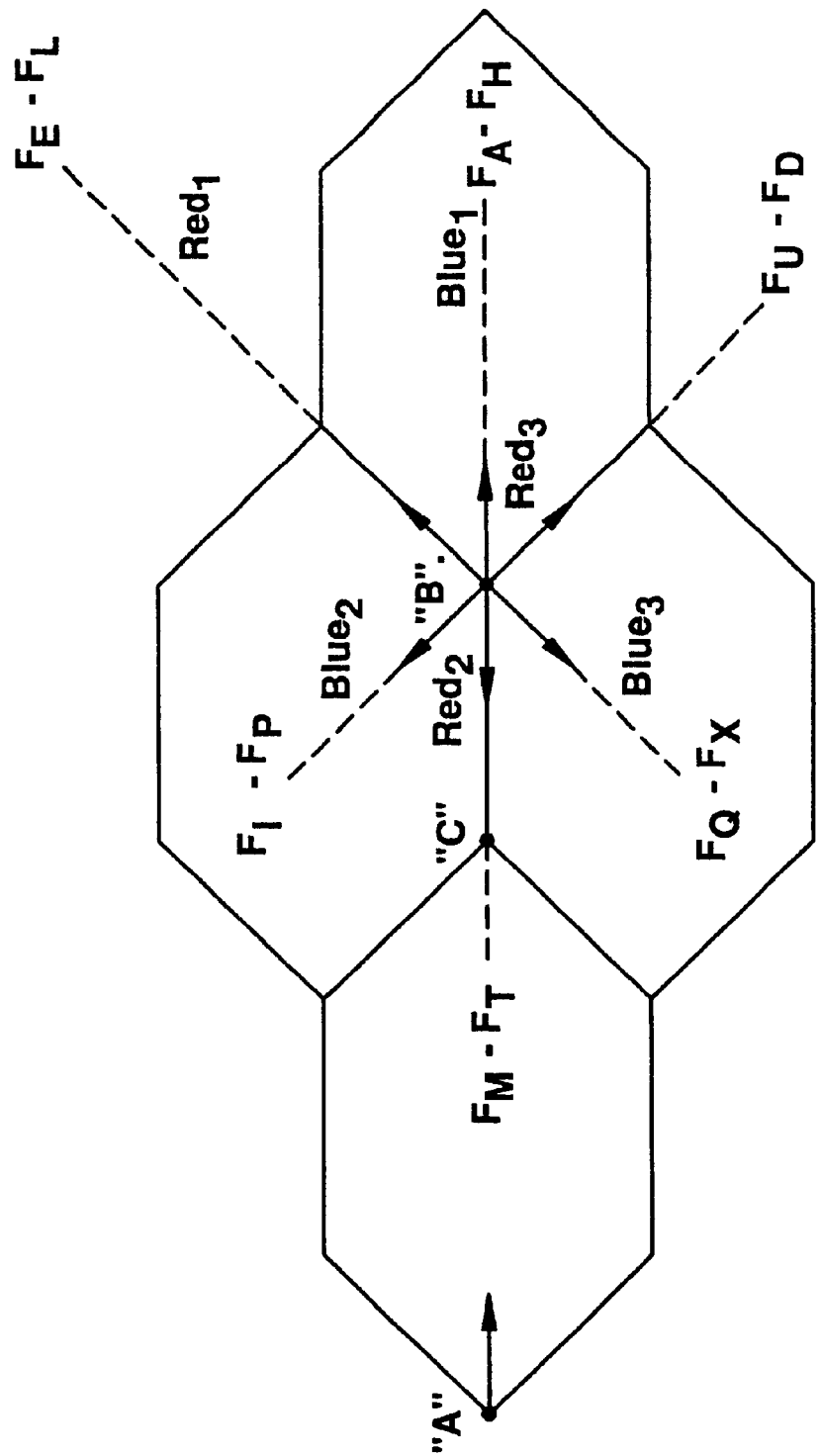
FIG. 5 illustrates an interstitial sector approach for improving the base station reception within existing cell sizes or enabling reception within larger cells for a GSM system.

Referring now to FIG. 5, there is illustrated the present invention within a GSM system. It appears, that the FCC will allocate an A-band range from 1850 to 1865 MHz and. a B-band range from the 1865 to 1890 MHz for PCS systems. Allocation will further include a duplex image 80 MHz higher than the corresponding A or B band. The GSM system operates with a nine-cell (three-sector, three-site) pattern having at least eight frequencies per sector (24 frequencies per site). Each of the three sectors in a particular site can frequency hop between the eight frequencies without synchronizing base stations, as the eight frequencies are unique to that sector.

As illustrated in FIG. 5, a base station site is divided into alternating "red" and "blue" sectors with the "red" sectors focused along 60°, 180° and 300° and the "blue" sectors focused along 0°, 120°, and 240°. Six antennas 16 are provided in the form of two superimposed three-sector systems. Without synchronization between different sites, each of the six sectors would only be able to frequency hop among four frequencies. In order to avoid reducing the frequency hopset and thus the order of frequency diversity when interstitial sectors are used, a method compatible with GSM's frequency hop algorithm has been devised enabling sharing of frequency sets between adjacent interstitial sectors.

Each sector is assigned eight of the 24 frequencies. Mobiles between 0° and 120° would use frequencies ABCDEFGH, mobiles between 120° and 240° would use frequencies IJKLMNOP, and mobiles between 240° and 0° would use QSTUVWX. The above frequencies are permitted to be originally radiated anywhere in the blue sectors. Mobiles in the red sectors use frequencies EFGHIJKL in "red" sector 60° to 180°, frequencies MNOPQRST in "red" sector 180° to 300° and frequencies UVWXABCD in "red" sector 300° to 60°. The table in FIG. 6 illustrates how 24 mobiles can hop orthogonally over the eight frequencies that the mobiles are permitted in the sector that they are located in. This scheme enables 24 conversations per six interstitial-sector site to take place using 24 frequency channels. The conversation frequency hops over eight of 24 frequencies in orthogonal fashion for each sector. No frequency is used in a location or radiated in a direction different from what would have been the case in a normal three-sectorization configuration.

The above scheme does not require synchronization between sites, only synchronization between sectors of the same site. Both the "blue" and "red" sectors at the same site must use the same PRN sequence, which is defined by a GSM frequency hopping, key and be programmed to generate selections between the eight assigned frequencies. Each of these requirements are within the scope of presently existing GSM frequency hopping technologies.

The above discussed principles can be extended to divide 24 frequencies between 12 or 24 sectors while still permitting each conversation to frequency hop orthogonally to the others over one-third of the total 24 frequencies. The system of FIG. 5 improves the receiver characteristics of a GSM base station in the same manner at the system discussed with respect to FIG. 3. Since mobiles are more likely to be within a beam peak, lower power mobiles are better received within existing size cells.

Figure 7:
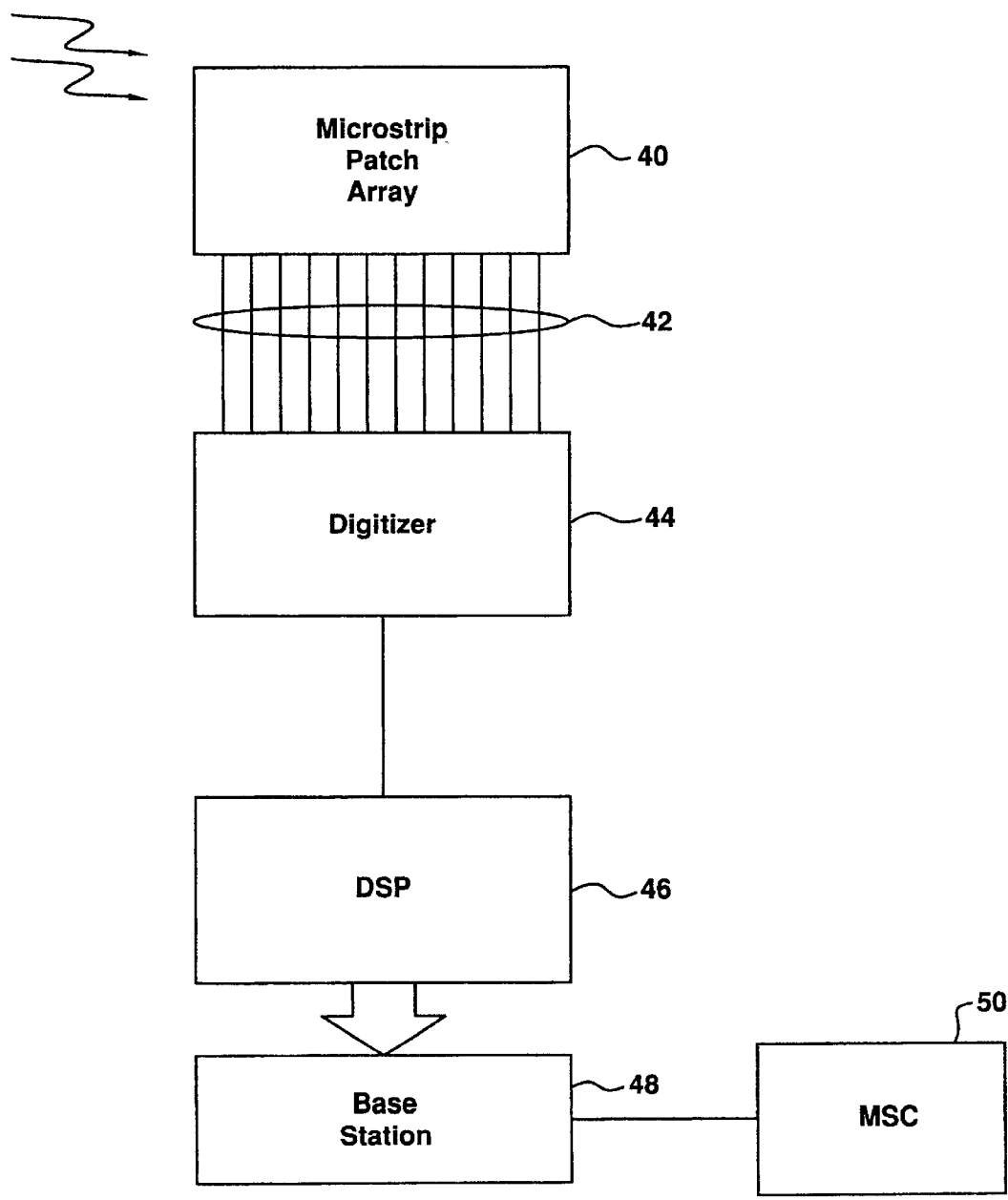
FIG. 7 is a block diagram illustrating a system for processing received signals at a base station site using an interstitial sector approach.

Referring now to FIG. 7, there is illustrated a block diagram of a multi-sector antenna setup at a base station providing between 6.5 and 11 dB of increased receiver sensitivity for a PCS system of a low-power hand portable. The antennas 40 generates overlapping directional antenna beams covering up to 360° of azimuth. The antennas 40 are constructed in a low cost manner using printed microstrip patch array antennas. Each patch array can also be an active transmit array for one circular polarization and a receive array for the opposite circular polarization. The polarization of the antennas would alternate between neighboring sectors.

The twelve received signals 42 are each digitized by an A/D converter 44 and processed by digital signal processor (DSP) 46. The DSP 46 employs a diversity combining equalizer to combine signals from three neighboring sectors to achieve between 6.5 and 11 dB of gain in receive performance. The signals are then passed to the base station 48 transmission and receiver apparatus for further processing.

Frequencies for each of the plurality of sector antennas 40 are assigned by the mobile switching center 50. The mobile switching center 50 is further responsible for controlling assignment of a portable radio telephone unit to the strongest available frequency. Due to the increased number of sectors located at a base station, the likelihood of a portable unit being located in or close to a beam peak is greatly increased, thus improving the reception characteristics for low power units.

Although an embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A base station for communicating with portable radio telephone units, comprising:
   a first base station at a site having a first three-sector antenna covering three, 120° sectors;
   a second base station co-located on the site with the first base station and having a second three-sector antenna covering three 120° sectors oriented between the 120° sectors of the first base station;
   means for transmitting and receiving along each of the sector antennas of the first and the second base station; and
   means for assigning available frequencies for the transmitter and a receiver means between the sectors of the first and the second base station.

2. The system of claim 1, further including means for assigning a portable radio telephone unit a frequency for communication, the frequency assigned corresponding to the sector antenna providing the strongest signal to the portable radio telephone unit.

3. The system of claim 2 wherein the means for performing diversity combinations comprises a diversity-combining equalizer.

4. The system of claim 1, further including means for performing diversity combinations on signals received using a sector antenna of said first base station and an adjacent sector antenna of said second, co-located base station.

5. The system of claim 1 wherein each sector antenna comprises printed microstrip patch arrays.

6. The system of claim 1, further including an analog to digital converter for digitizing signals received by each sector antenna.

7. The system of claim 1, further including means for alternating circular polarization between adjacent sectors.

8. The system of claim 1 wherein the means for controlling frequency channels equally divides frequency channels among the plurality of sectors of the site.

9. A method for improving reception at a base station site for portable radio telephone units, comprising the steps of:
   co-locating first and second base stations at the base station site, each of the base stations including a three-sector antenna covering three, 120° sectors;
   orienting the three, 120° sectors of the antenna of the first base station between the three, 120° sector of the antenna of the second base station;
   assigning an available set of frequencies between the sector antennas of the first and second base stations; and
   transmitting and receiving using the assigned frequency for each sector antenna.

10. The method of claim 9, further including the step of combining signals from a portable radio telephone unit received by adjacent sector antennas in order to enhance signal reception.

11. The method of claim 9, further including the step of alternating circular polarization between adjacent sectors to improve effects of combination of adjacent sector signals from the same portable radio telephone unit.

12. The method of claim 9, further including the steps of:
   digitizing received signals from the sector antennas; and
   combining digitized signals from neighboring sectors to generate a signal having improved gain characteristics.

13. The method of claim 9, further including the step of assigning a portable radio telephone unit to a frequency providing a strongest signal.

14. The method of claim 9 wherein the step of assigning further includes the step of assigning the available set of frequencies approximately equally between the sector antennas.

15. A base station having a group of assigned frequencies for transmission and reception, said base station comprising:
   a plurality of primary sectors having directional antennas disposed to radiate substantially overlapping beams that are staggered in azimuth; at least one interstitial sector between two of said primary sectors, said interstitial sector being covered by said overlapping beams from the directional antennas to the adjacent primary sectors;

a combiner associated with said interstitial sector for combining signals transmitted from or received by said directional antennas in the adjacent primary sectors to form virtual beams for transmission or reception in said interstitial sector, said virtual beams having directions lying in between principal directions of said overlapping beams; and wherein said group of assigned frequencies is divided among said primary sectors and said interstitial sector such that said interstitial sector is assigned to a different set of frequencies than the adjacent primary sectors.

16. The base station of claim 15 comprising a plurality of interstitial sectors.

17. The base station of claim 16 wherein the number of interstitial sectors is greater than the number of directional antennas.

18. A method of configuring a base station comprising:

defining a plurality of primary sectors with directional antennas disposed to radiate substantially overlapping beams that are staggered in azimuth;

defining at least one interstitial sector between two of said primary sectors, said interstitial sector being covered by said overlapping beams of adjacent primary sectors;

dividing a group of frequencies allocated to said base station among said primary sectors and said at least one interstitial sector such that said at least one interstitial sector is assigned to a different set of frequencies than the adjacent primary sectors; and combining signals transmitted from or received by said directional antennas in said primary sectors adjacent to said at least one interstitial sector to form a virtual beam for transmission and reception in said at least one interstitial sector.

19. The method of claim 12 wherein defining at least one interstitial sector between two of said primary sectors comprises defining a plurality of interstitial sectors between said primary sectors.

20. The method of claim 19 wherein the number of interstitial sectors defined is greater than the number of directional antennas.

* * * * *